(12) United States Patent
Bissoli

(10) Patent No.: US 9,224,369 B2
(45) Date of Patent: Dec. 29, 2015

(54) DEVICE FOR MODELING (SHAPING) SURFACE OF FRET, FRET BOARD, OR FINGERBOARD OF STRING INSTRUMENT

(76) Inventor: Davide Bissoli, Tokyo (JP)

( * ) Notice: Subject to any disclaimer, the term of this patent is extended or adjusted under 35 U.S.C. 154(b) by 288 days.

(21) Appl. No.: 13/817,799

(22) PCT Filed: Aug. 22, 2011

(86) PCT No.: PCT/JP2011/068898
§ 371 (c)(1),
(2), (4) Date: Feb. 19, 2013

(87) PCT Pub. No.: WO2012/023628
PCT Pub. Date: Feb. 23, 2012

(65) Prior Publication Data
US 2013/0139367 A1    Jun. 6, 2013

(30) Foreign Application Priority Data

Aug. 20, 2010   (JP) .................................. 2010-185505
Sep. 27, 2010   (JP) .................................. 2010-215278

(51) Int. Cl.
| G10D 1/00  | (2006.01) |
| B24D 15/02 | (2006.01) |
| B23D 71/04 | (2006.01) |
| G10D 3/06  | (2006.01) |

(52) U.S. Cl.
CPC ................ *G10D 1/005* (2013.01); *B24D 15/02* (2013.01); *B23D 71/04* (2013.01); *G10D 3/06* (2013.01); *Y10T 29/44* (2015.01)

(58) Field of Classification Search
CPC .......... G10D 1/005; G10D 3/06; G10D 1/08; G10D 3/00; B24D 15/02; B24D 15/00; B23D 71/04; Y10T 29/44; Y10T 29/49574
See application file for complete search history.

(56) References Cited

U.S. PATENT DOCUMENTS

| 3,892,091 | A  | * | 7/1975  | Hutchins ..................... 451/356 |
| 4,037,510 | A  |   | 7/1977  | Ginex                                 |
| 5,465,740 | A  | * | 11/1995 | Kim .............................. 132/73.6 |
| 5,706,835 | A  | * | 1/1998  | Salvino ........................ 132/75.6 |
| 6,978,506 | B2 | * | 12/2005 | Uskup ............................. 15/114 |
| 7,927,192 | B2 | * | 4/2011  | Annis ........................... 451/456 |
| 2008/0271587 | A1 |   | 11/2008 | Cross                                 |

FOREIGN PATENT DOCUMENTS

JP            52112312 A        9/1977

OTHER PUBLICATIONS

International Search Report mailed Oct. 18, 2011, issued in corresponding International Application No. PCT/JP2011/068898, filed Aug. 22, 2011, 2 pages.

* cited by examiner

*Primary Examiner* — Sarang Afzali
(74) *Attorney, Agent, or Firm* — Christensen O'Connor Johnson Kindness PLLC

(57) ABSTRACT

Provided is a tool for polishing the surface of frets, a fretboard or a fingerboard of a stringed instrument, so as to shape and adjust the frets, the fretboard or the fingerboard to have a curve appropriate for the stringed instrument having a curve.

12 Claims, 13 Drawing Sheets

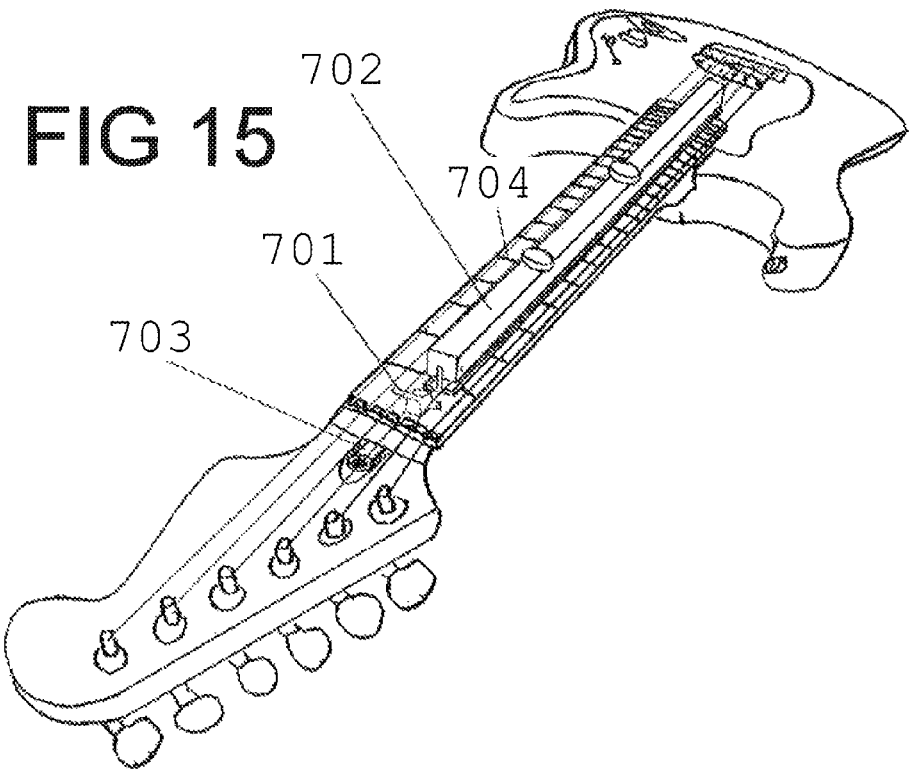
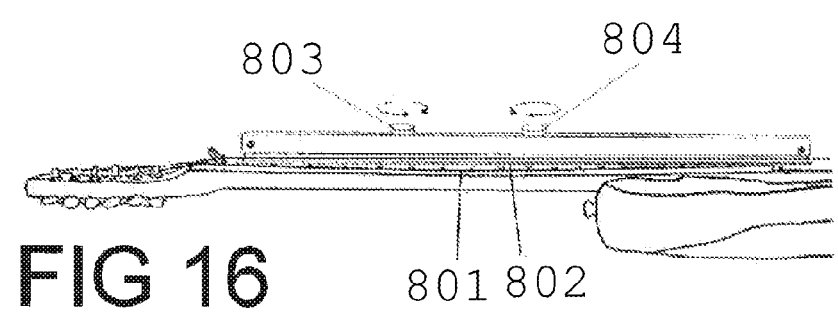

FIG 17
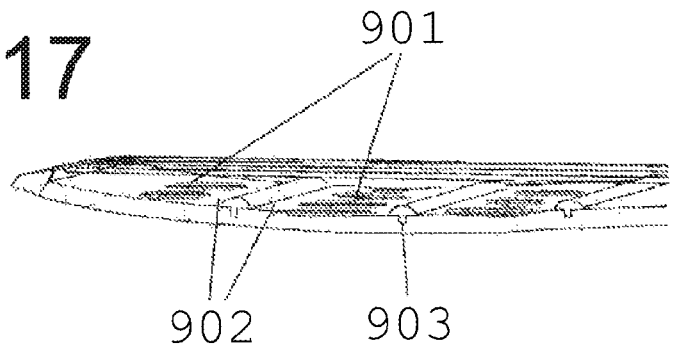
FIG 18
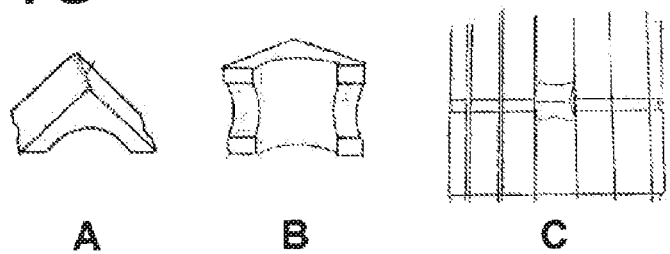
A     B     C
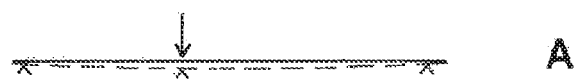
A
FIG 19
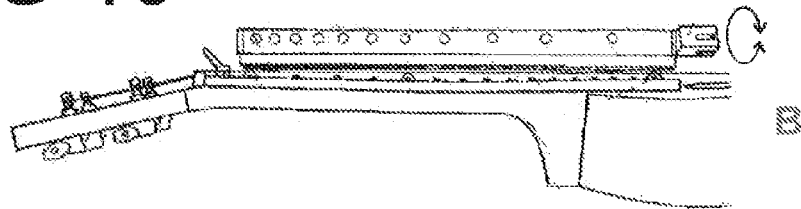

FIG 20
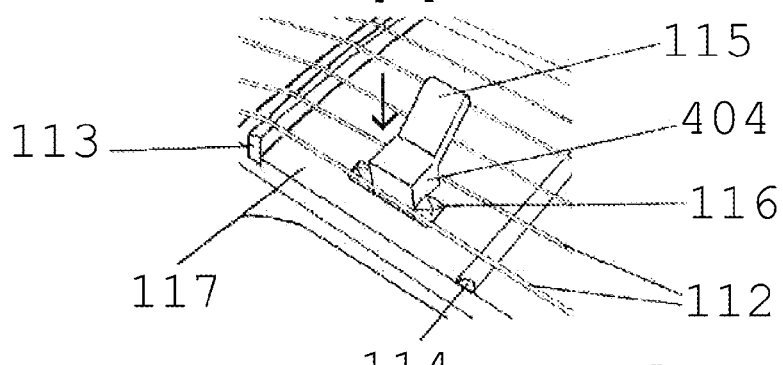
A
B
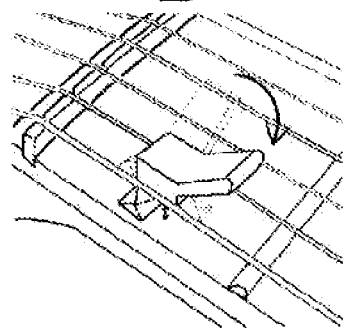
C
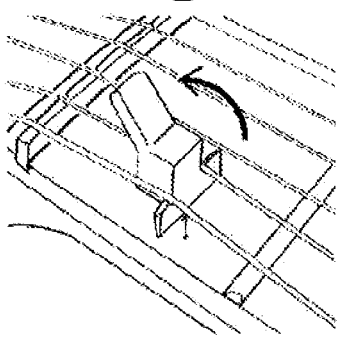
FIG 21
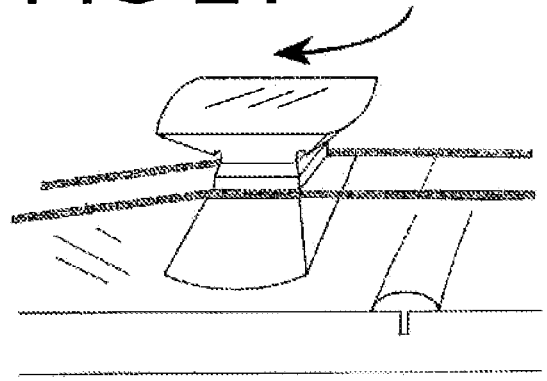
FIG 22
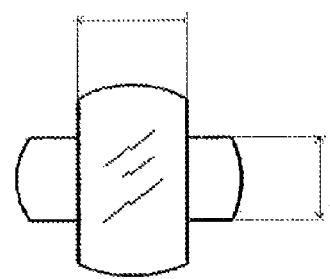

DEVICE FOR MODELING (SHAPING) SURFACE OF FRET, FRET BOARD, OR FINGERBOARD OF STRING INSTRUMENT

TECHNICAL FIELD

The present invention relates to optimization of frets, a fretboard or a fingerboard of a stringed instrument.

BACKGROUND ART

When a string of a stringed instrument is plucked, the string forms a special waveform by the vibration. In order to produce a clear sound without causing a buzzing sound or a problem in producing sound, it is necessary that the portion where the string comes into contact with the frets, the fretboard or the fingerboard, has a curve which complies with the movement of the string. The thickest string which produces the lowest key (marked as No. 10 in FIG. 4) forms the largest curve (marked as No. 11 in FIG. 4). Therefore, the curve formed by this thickest string is the deepest. Accordingly, the curve (marked as No. 13 in FIG. 4) formed by the thinnest string (marked as No. 12 in FIG. 4) is the shallowest.

A technique to accurately shape the frets (marked as No. 156 in FIG. 27), the fretboard (marked as No. 157 in FIG. 27) or the fingerboard (marked as No. 168 in FIG. 28) of a stringed instrument by hand, so as to provide them with a gradually altering curve, has not been known to public until now.

The tool according to the present invention can accurately adjust the curve of the tool itself, and can accurately shape the curve appropriate for the frets, the fretboard or the fingerboard of the stringed instrument, by polishing the surface thereof. The tool according to the present invention provides good results, since the operation can be conducted with the strings on, without disturbing the perfect balance for the stringed instrument.

Regarding a stringed instrument having frets, it is necessary to level the frets so that the instrument functions well and smooth performance is achieved. Leveling frets has always been conducted in the condition where the surface of the frets is made linear as possible. The surface is made linear by adjusting the neck of the stringed instrument.

After leveling is conducted, the neck is adjusted again in order to apply a slight curve to the neck, and thus the curve of the neck complies with the movement of the strings. Further, a standard technique for leveling frets assumes removal of the strings in order to allow the tool to reach the fretboard.

SUMMARY OF THE INVENTION

Problems to be Solved by the Invention

The problem to be solved is the buzzing sounds and problem in producing sounds. These problems occur when the frets, the fretboard, or the fingerboard of the stringed instrument are not shaped correctly, for example when they have a wrong curve. Otherwise, when the strings are located high from the frets, the fretboard or the fingerboard of the stringed instrument, performance becomes difficult.

Among stringed instruments, there are instruments whose curve of the neck cannot be adjusted. For example, an electric guitar (marked as No. 141 in FIG. 26) having a defect cannot be adjusted, even if it is provided with an adjustment tool like a truss rod (marked as No. 145 in FIG. 26). Further, there are also stringed instruments, whose curves of the necks are originally unadjustable, such as a classic guitar (marked as No. 152 in FIG. 27) and a violin (marked as No. 163 in FIG. 28).

There are two essential problems in the standard technique used in leveling frets. The first problem is that the adjustment of the neck is far from perfect, and the second problem is the wrong tradition to conduct the leveling without strings on. When the instrument is not strung, the instrument does not have its original balance. Then, when the string is restrung, the shape of the neck changes due to the unpredictable deformation of the wood of the neck, such deformation being like, the movement of a snake. Thus, the instrument is not in its original condition.

Means for Solving the Problems

Since the tool according to the present invention enables accurate adjustment of the curve, a curve appropriate for the frets, the fretboard or the fingerboard of the stringed instrument can be shaped.

Effect of the Invention

The tool according to the present invention can achieve perfect leveling of the frets of the stringed instrument. There are three major effects. The first effect is that there is no need to re-adjust the instrument after the operation. The second effect is enablement of leveling while the balance of the instrument is maintained in the same way as the balance when the instrument is used. This can be achieved since the leveling is conducted in the condition where the strings are strung. The third effect is the capability to ensure the adjustment little by little, by plucking the instrument at any time during the operation.

That is, the tool according to the present invention can optimize the performance of the instrument, achieves clear sound, and enhances operability during musical performance.

BRIEF DESCRIPTION OF THE DRAWINGS

FIG. 1 is a front view of an embodiment of the tool according to the present invention, FIG. 2 is a side view of an embodiment of the tool according to the present invention, and FIG. 3 is an exploded view of an embodiment of the tool according to the present invention.

FIG. 4 is a figure showing a standard fretboard.

FIG. 5 is a perspective view of an embodiment of the tool according to the present invention, and FIG. 6 is a perspective view of an embodiment of the tool according to the present invention and an exploded view of a part of the tool according to the present invention.

FIG. 7 is a side view of one embodiment of the tool according to the present invention being exploded, FIG. 8 is a front view of one embodiment of the tool according to the present invention being exploded, and FIG. 9 is a front view of one embodiment of the tool according to the present invention being assembled.

FIG. 10A is a side view of one embodiment of the tool according to the present invention being assembled and FIG. 10B is an exploded view, and FIG. 11A is a side view of one embodiment of the tool according to the present invention being assembled and FIG. 11B is an exploded view.

FIG. 12 is a perspective view of the fretboard and a figure showing the tool being inserted from between the strings, and FIG. 13 is a side view of one embodiment of the tool according to the present invention being used on the musical instrument.

FIG. 14 is a plan view of one embodiment of the tool, according to the present invention, being used on the musical instrument.

FIGS. 15-16 are explanatory figures showing the method of use of the tool according to the present invention.

FIG. 15 is a figure showing one embodiment of the tool according to the present invention being mounted onto a musical instrument, and FIG. 16 is a figure showing one embodiment of the tool according to the present invention being used.

FIGS. 17-19 are explanatory figures showing an auxiliary tool.

FIG. 17 is a figure showing a fretboard,

FIGS. 18A-18C show an accessory for measurement used to confirm the condition of the curve, and FIG. 19 is a figure showing the accessory for measurement being mounted onto the instrument to confirm the condition of the curve.

FIGS. 20-22 are explanatory figures showing an auxiliary tool.

FIGS. 20A-20C show an auxiliary tool being used,

FIG. 21 is a figure showing an auxiliary tool being used, and

FIG. 22 is a figure showing an auxiliary tool being used.

FIG. 23 is a figure showing one embodiment of the tool according to the present invention being mounted onto a musical instrument, FIG. 24 is a bottom view of one embodiment of the tool according to the present invention, and FIG. 25 is an explanatory view showing the bottom of the embodiment of the tool according to the present invention.

FIG. 26 is a figure showing an electric guitar,

FIG. 27 is a FIGURE showing a classical guitar, and

FIG. 28 is a figure showing a violin.

FIGS. 29A and 29B are side views showing two types of bottoms.

EMBODIMENT FOR CARRYING OUT THE INVENTION

Hereinafter, five embodiments of the present invention will be explained with reference to FIGS. 1 to 29.

The tool according to the present invention includes a polishing section as the basic section, and is used for polishing to shape frets, a fretboard or a fingerboard of a stringed instrument.

Figure 1:
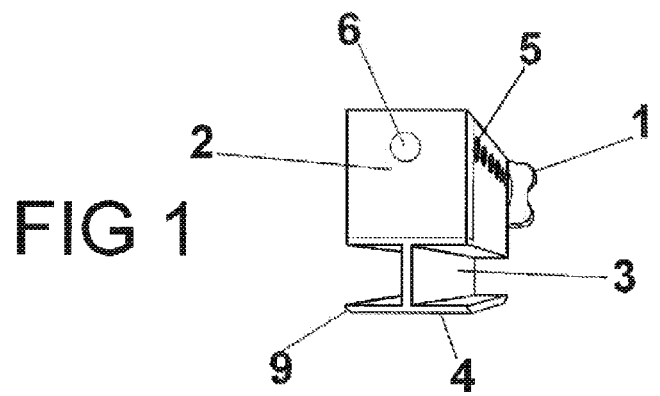
FIGS. 1-3 are explanatory figures showing the embodiment of the tool according to the present invention.

The first embodiment is shown. FIG. 1 is a front view of the tool. The tool is essentially structured with three components.

The first component is a bottom (marked as No. 4 in FIG. 1). The bottom is horizontal (FIG. 29A), or is concaved (FIG. 29B) in the cross-sectional direction, and can be transformed in the longitudinal direction (the longer direction). The thickness of the bottom is appropriate for leveling frets, the fretboard or the fingerboard of the stringed instrument, with the bottom being placed under the string. The width of the bottom is approximately the spacing for three strings, or is two times the spacing of two strings, such spacing being observed at the center of the fretboard when the tool is loaded on the instrument. The length of the bottom is approximately the length from the nut (marked as No. 17 in FIG. 4) to the last fret (marked as No. 18 in FIG. 4). Otherwise, the length of the bottom is approximately the entire length of the fretboard or the fingerboard in the longitudinal direction. Here, the bottom is identical with the portion marked as No. 4 in FIG. 2. In order to perform polishing to shape the frets, the fretboard or the fingerboard of the stringed instrument, the lower surface of the bottom has a function for polishing. The portion of the bottom is equipped with sandpaper, diamond powder, file and the like. Both ends of the bottom are inclined in upper direction (marked as No. 9 in FIG. 1). Thus, operation can be conducted without being caught, and the sandpaper is prevented from coming off during polishing, in the case where the sandpaper and the like are attached.

The second component is a supporting strut arranged in a perpendicular direction (marked as No. 3 in FIG. 1). The length of the supporting strut is identical to the length of the bottom in the longitudinal direction. The lower side of the supporting strut is bound to the bottom at the center of the bottom in the width direction of the bottom. The upper side of the strut (the opposite side as the side bound to the bottom) is bound to a third component.

The third component is a shank having a long structure and can be used as a handle (marked as No. 2 in FIG. 1). Inside this shank having a long structure, a mechanism to change the shape of the shank itself is provided. The two ends of the curve generated by this mechanism correspond with the portions marked as A and B in FIG. 2. The curve dents toward the portion marked as No. 4 in FIG. 2, that is, toward the bottom.

Figure 2:
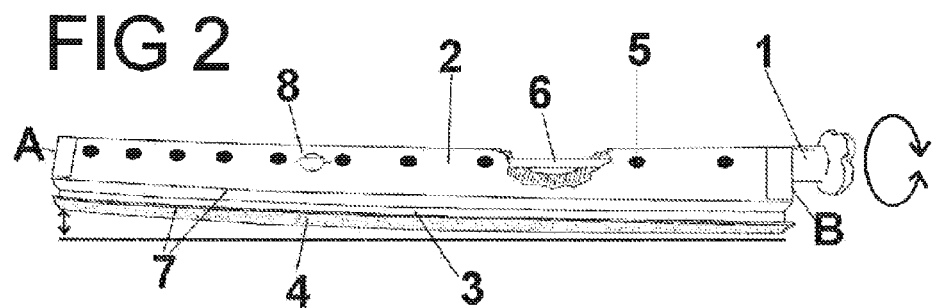
Figure 3:
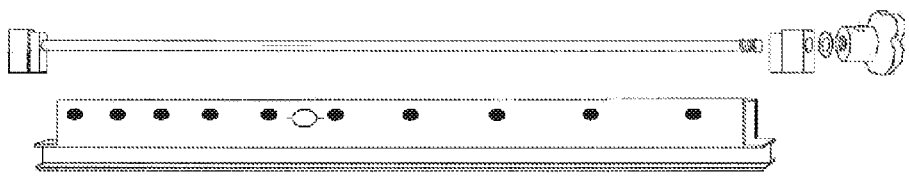

The curve is generated by compression in the longitudinal direction of the shank, from A and B in FIG. 2. The compression can be generated by pulling the internal rod (marked as No. 6 in FIG. 2). One end of this rod is fixed to a portion of the shank (marked as A in FIG. 2).

The other end penetrates through the shank, and comes out from the portion marked as B in FIG. 2. Thus, the other end can be screwed into a knob (marked as No. 1 in FIG. 2). By twisting the knob, a rod is pulled, thereby holding down the shank. In order to obtain a calculated curve (asymmetric curve), it is necessary that a particular portion of the shank is lowered in strength. The strength of the shank can be lowered by removing a substance from the shank. One example is a hole (marked as No. 5 in FIG. 2).

The polishing surface (marked as No. 4 in FIG. 1) is tightly bound to the shank by the supporting strut (marked as No. 3 in FIG. 1). Accordingly, when a curve is generated with the shank, the same curve is generated with the polishing surface.

Figure 4:
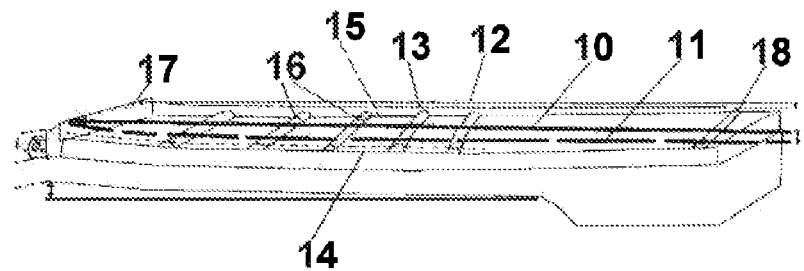
FIG. 4 is an explanatory figure showing the embodiment of the tool according to the present invention.

When the stringed instrument is set-up to an optimum state, inspection should be done to locate a portion where the fret is worn by the abrasion by the string (marked as No. 16 in FIG. 4). When there is a worn fret, it is necessary to replace the fret first.

A curve is generated at the bottom (marked as No. 7 in FIG. 2) of the tool (marked as No. 2 in FIG. 2), by twisting the knob (marked as No. 1 in FIG. 2), while watching the guide line (marked as No. 8 in FIG. 2). The degree of the curve should be conformed to the most ideal curve of the instrument to be adjusted. The most ideal curve is, in the case described in FIG. 4 for example, the curve positioned under the thickest string (marked as No. 14 in FIG. 4).

In order to create a space, an auxiliary tool (marked as No. 404 in FIG. 12) is inserted under the strings, and the strings are lifted. It is recommended that the two strings to be lifted first be the thickest string and the string adjacent thereto.

The strings are lifted by the following procedure. The auxiliary tool for creating a space (marked as No. 404 in FIG. 12) is identical to the auxiliary tool marked as No. 404 in FIG. 20. The auxiliary tool is inserted in a perpendicular direction in between the strings (marked as No. 112 in FIG. 20). Thus the auxiliary tool is mounted on the fretboard (marked as No. 7 in FIG. 2). The position where the auxiliary tool should be inserted is the medium point between the nuts (marked as No. 113 in FIG. 20) and the first fret (marked as No. 114 in FIG. 20). Then, a lever (marked as No. 115 in FIG. 20A) is turned by 90 degrees in a horizontal direction (as shown in FIG. 20B). Since the wings (marked as No. 116 in FIG. 20A) are inclined, the strings can be lifted by sliding the auxiliary tool under the strings. When more height is required for the space, the strings can be further lifted by lifting the lever (as shown in FIG. 20C). FIG. 21 and FIG. 22 show different forms of the auxiliary tools which have the same function as the auxiliary tool of FIG. 20.

After the two strings are lifted, the tool (marked as No. 402 in FIG. 12) is inserted between the two strings by inclining the bottom of the tool, until the supporting strut (marked as No. 3 in FIG. 12) comes into contact with the strings. When the supporting strut comes into contact with the strings, the tool is lowered so that the rest of the bottom is placed under the strings. Then, the tool is moved until the end of the tool comes close to the auxiliary tool for creating space (marked as No. 404 in FIG. 12). Accordingly, all the frets are covered with the bottom.

Figure 14:
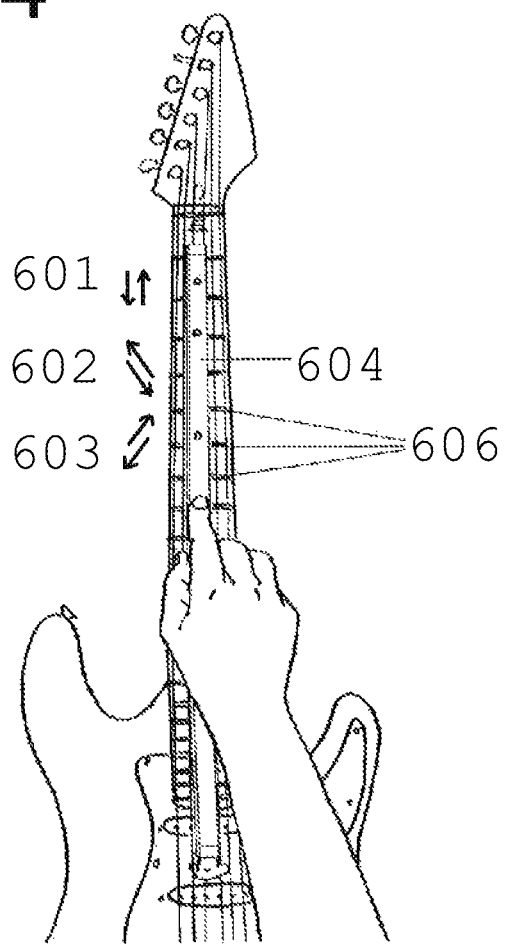
FIG. 14 is an explanatory figure showing the method of use of the tool according to the present invention.
Figure 23:
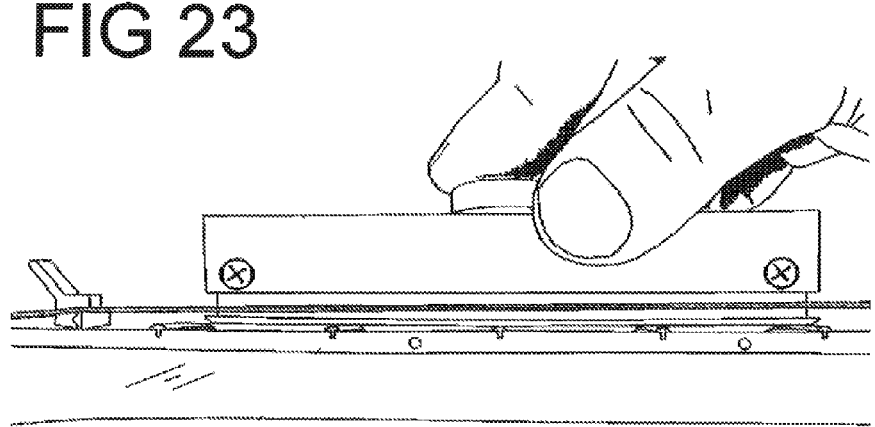
FIGS. 23-25 are explanatory figures showing the embodiment of the tool according to the present invention.

To start shaping, the tool (marked as No. 604 in FIG. 14) is first moved back and forth (as described as No. 601 in FIG. 14). When the operation is conducted, considering a case of an instrument having 22 frets, a hand is placed on the tool so that the hand overlaps with the 12th fret (marked as No. 505 in FIG. 13), and the hand should lightly suppress the tool. The other hand supports the instrument around the center of the neck from underneath (marked as No. 506 in FIG. 13). The polishing is first started from the position where the left side of the supporting strut comes in contact with the string. Then, while moving the tool back and forth, the tool is slid gradually towards right until the right side of the supporting strut comes in contact with the string. Accordingly, the height of all the frets are leveled and appropriate adjustment can be conducted.

Adjustment can be made appropriately by moving the tool, so as to trace the letter X. First, the tool (marked as No. 604 in FIG. 14) is moved several times in the direction from upper left to lower right, and from lower right to upper left, as shown by the arrow (marked as No. 602 in FIG. 14). Then, the tool is moved several times in the direction from upper right to lower left, and from lower left to upper right, as shown by the arrow (marked as No. 603 in FIG. 14). This movement tracing the letter X is counted as one set. After each set of the operation is done, the tool is unloaded from the instrument to confirm the condition of the frets (marked as No. 606 in FIG. 14). The operation is repeated until a trace of polishing can be seen on all the frets. When this condition is reached, the operation in the area of the first two strings is complete.

The curve of the tool is adjusted before moving on to the next two strings. The curve made by the string becomes smaller than the curve made under the thickest string. The curve of the frets, the fretboard or the fingerboard of the stringed instrument gradually decreases towards the thinnest string, and eventually becomes substantially linear (as shown in No. 15 in FIG. 4). Therefore, the degree of the curve shall be adjusted so as to correspond with the position and the instrument.

Adjustment of the tool's curve, insertion of the tool by lifting the strings, and polishing operation so as to trace the letter I and letter X, are conducted for all of the spaces between the strings.

Hereinafter, the second embodiment is described.

Figure 5:
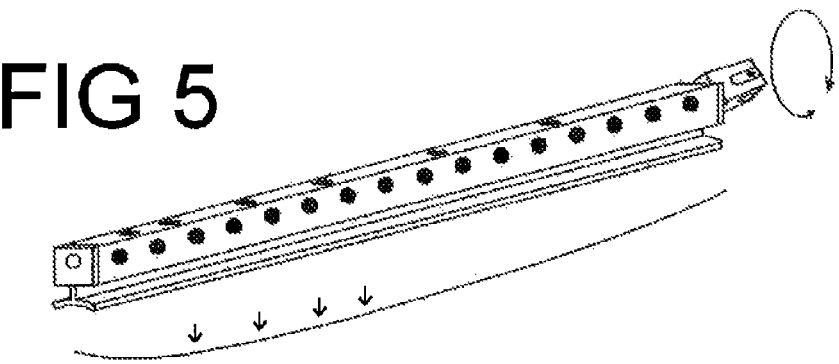
FIGS. 5-6 are explanatory figures showing the embodiment of the tool according to the present invention.

The basic structure is similar with the first embodiment of FIG. 5. Therefore, only the features differing from the first embodiment will be explained.

The second embodiment differs from the first embodiment by the feature that the strength of the shank is not lowered at any particular portion. In the first embodiment, such lowering of the strength was made to obtain an asymmetric curve. Therefore, the curve of the bottom obtained by using the handle (marked as No. 106 in FIG. 6) is symmetrical.

In order to obtain an asymmetric curve, another tool (marked as No. 104 in FIG. 6) is provided.

The length of the tool (marked as No. 104 in FIG. 6) is shorter than the main body of the tool, and a second tool can be mounted onto the main body from the outside of the main body. The second tool supports the shank (marked as No. 105 in FIG. 6) from underneath, with four protrusions (marked as No. 103 in FIG. 6) provided at the edge thereof.

Figure 6:
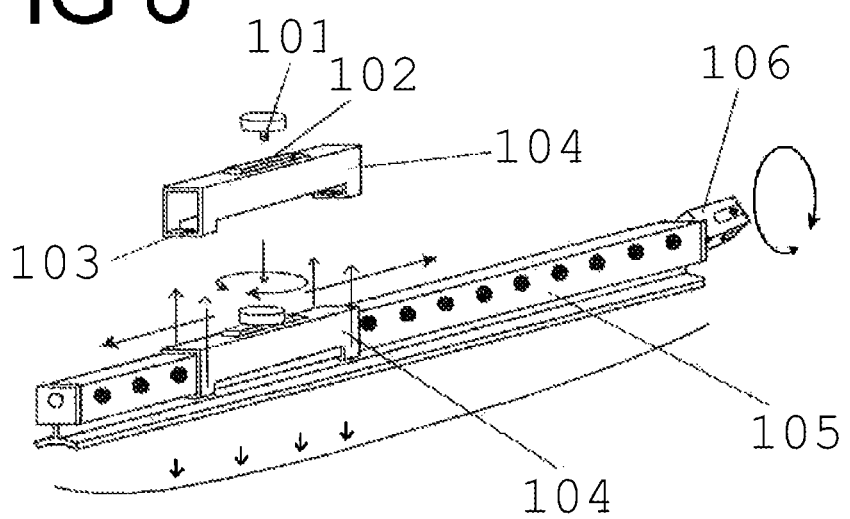

When the screw (marked as No. 101 in FIG. 6) is tightened, the screw enters the main body by going through the portion (marked as No. 102 in FIG. 6) which functions as a female screw, thereby applying force to press the shank (marked as No. 105 in FIG. 6). The force alters the symmetric curve obtained by the handle (marked as No. 106 in FIG. 6) into an asymmetric curve.

One or more of the second tool (marked as No. 104 in FIG. 6) can be mounted onto the main body.

Hereinafter, the third embodiment is described.

The tool according to the third embodiment is structured with a long bottom (marked as No. 201 in FIG. 7) having slight flexibility. The bottom has an appropriate thickness to allow the bottom to move swiftly between the frets (marked as No. 704 in FIG. 15) and the strings of the stringed instrument.

In this embodiment, the length of the bottom is approximately the length of the fretboard, and the width is approximately the distance of three strings.

One surface of the bottom is suitable for providing an adhesive sandpaper or other equivalents for the purpose of polishing.

To the opposite surface of the bottom, a supporting strut (marked as No. 2011 in FIG. 7) is attached. The supporting strut is located at the medium point of the bottom with respect to the width direction, and is perpendicular with respect to the bottom. The length of the supporting strut is the same as the length of the bottom. Otherwise, to the opposite surface, four supporting struts (marked as B in FIG. 8) are attached. Two of the supporting struts are fixed to a hard supporting member, and the other two supporting struts are located between the two supporting struts, where it is pressed by a lever for adjustment. The four supporting struts are located at the medium point of the bottom with respect to the width direction.

Figure 7:
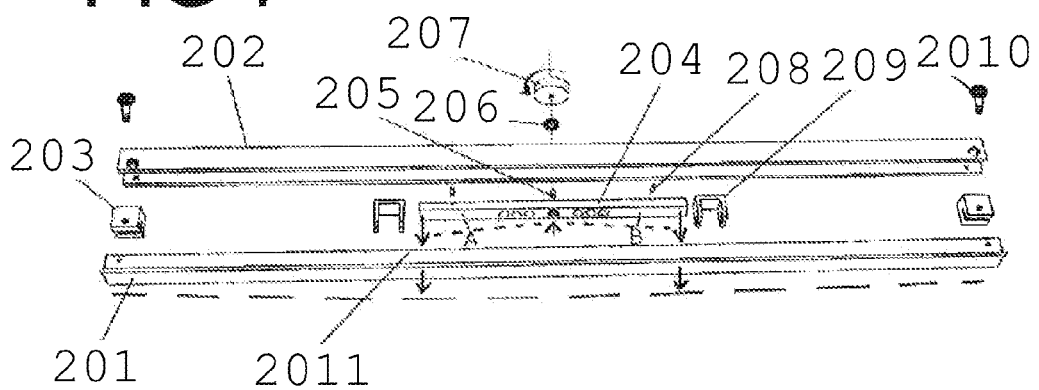
FIGS. 7-9 are explanatory figures showing the embodiment of the tool according to the present invention.
Figure 8:
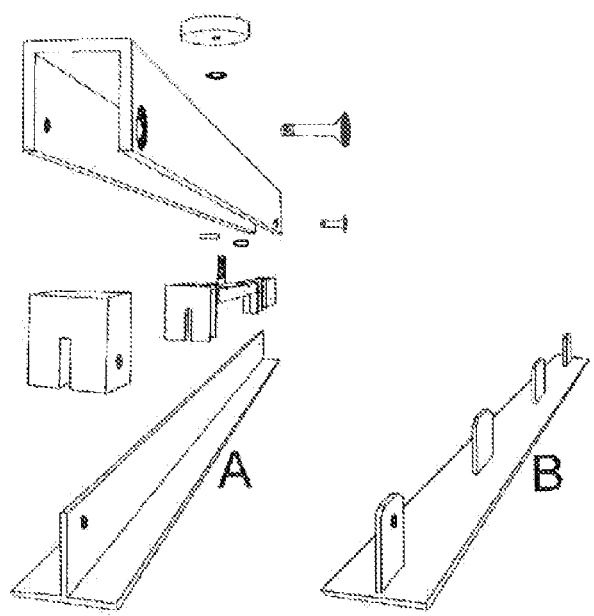
Figure 9:
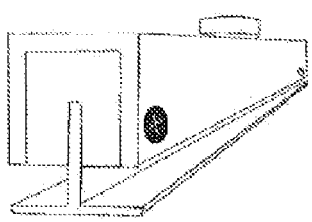

The supporting strut is fixed to the hard supporting member (marked as No. 202 in FIG. 7), in a manner, for example with two screws (marked as No. 2010 in FIG. 7). The two screws also function to fix the blocks (marked as No. 203 in FIG. 7) which reinforce the hard supporting member, and to firmly hold the supporting strut.

In the present embodiment, a guide (marked as No. 209 in FIG. 7) can be added to further fix the supporting strut.

In order to shape the polishing surface at the bottom into a curved shape, a first class lever system is adopted in the present embodiment (marked as A and B in FIG. 7). The first class lever system, which is provided at the middle portion of the bottom, is structured with a flexible bar (marked as No. 204 in FIG. 7). The lever system is fixed by a screw (marked as No. 205 in FIG. 7) for providing tension, and has two fulcrums (marked as No. 208 in FIG. 7), each being located between the lever and the hard supporting member.

In the present embodiment, when the screw (tension screw) is pulled by a small roller with a groove (marked as No. 207 in FIG. 7), the two levers (marked as A and B in FIG. 7) are moved in an up-and-down direction, thereby bending the middle portion of the bar (marked as No. 204 in FIG. 7).

In this manner, the two ends of the levers, each located at the opposite side with respect to the screw, press the supporting strut away from the hard supporting member. A washer (marked as No. 206 in FIG. 7) can further smooth the movement of the small roller.

Since the supporting strut is fixed to the hard supporting member at both ends thereof, the supporting strut and the bottom each forms a curve corresponding to the amount of the small roller being tightened. Accordingly, a controlled curve can be provided to the supporting strut (marked as No. 2011 in FIG. 7) and to the bottom (marked as No. 201 in FIG. 7). The same result can be obtained with the bottom with another structure (marked as B in FIG. 8). The curve thus obtained is accurate and secure, since it is formed with four points.

Hereinafter, one method for using the present invention will be explained.

First, in a case where a truss rod (marked as No. 703 in FIG. 15) is available, the instrument should be adjusted to an optimum condition by the truss rod.

Then, an auxiliary tool (marked as No. 701 in FIG. 15) to create a space for avoiding the bottom of the tool to come in contact with the string is inserted under the two adjacent strings near the nut on the fretboard. Any auxiliary tool can be used so long as it serves the function to avoid the bottom of the tool to come in contact with the strings. The tool (marked as No. 702 in FIG. 15) is inserted from between the two strings, to allow the tool to cover all the frets.

The curve of the bottom (marked as No. 802 in FIG. 16) is adjusted so as to follow the curve of the fretboard (marked as No. 801 in FIG. 16), by tightening the small rollers (marked as No. 803 in FIG. 16).

The frets are polished so that the high frets and the low frets are leveled. Polishing is conducted diagonally from one end to another end of the fretboard.

The strings are removed, and finish polishing is conducted to round the edges of the frets, without disturbing the height of the frets.

Hereinafter, the fourth embodiment is described.

Figure 10:
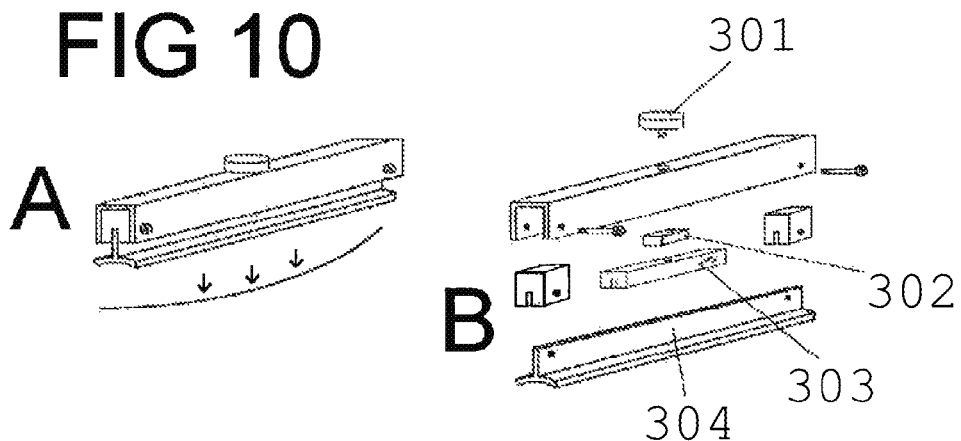
FIGS. 10-11 are explanatory figures showing the embodiment of the tool according to the present invention.

The tool of FIG. 10 is suitable to conduct the operation for a portion of the fretboard.

The length of the tool is longer than the distance between four frets on the fretboard.

The structure of the present embodiment is similar to those of the third embodiment. Here, since the length of the tool is shorter, the system for providing the bottom with a curve is different.

When the screw (marked as No. 301 in FIG. 10B) is tightened, the screw enters the main body by going through a portion which functions as a female screw (marked as No. 302 in FIG. 10B), thereby pressing the block (marked as No. 303 in FIG. 10B). The force thus provides the supporting strut with the curve (marked as No. 304 in FIG. 10B).

Hereinafter, the fifth embodiment is described.

Figure 11:
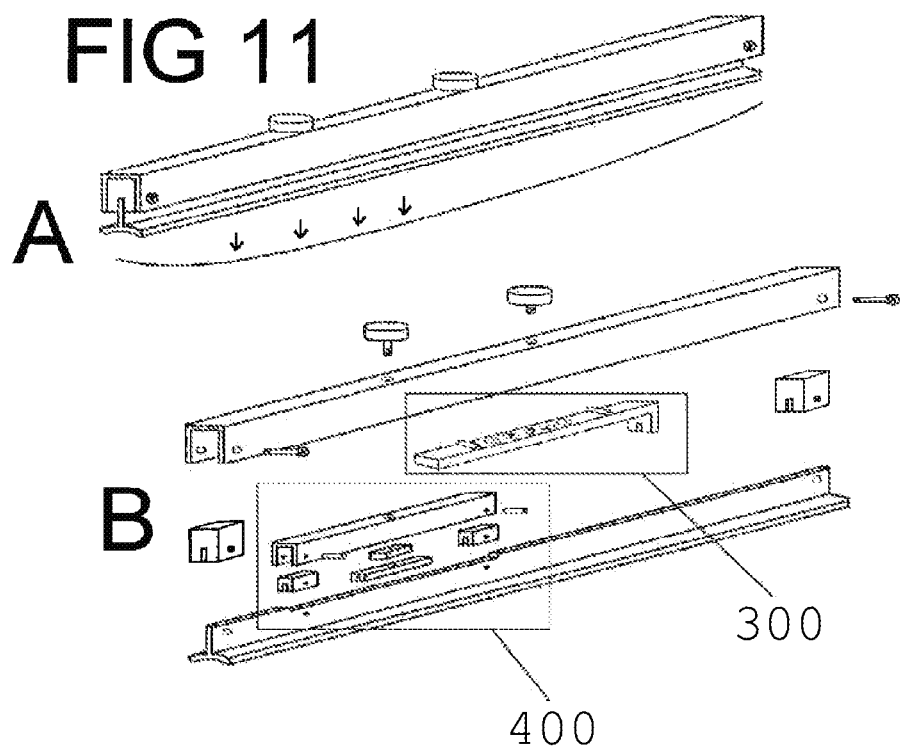
Figure 12:
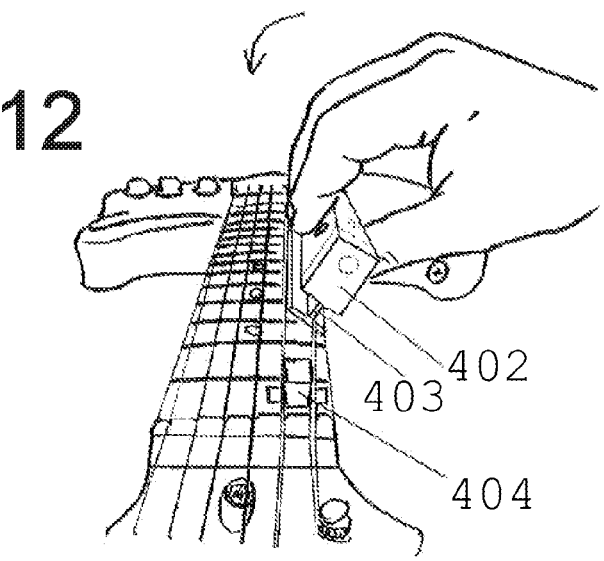
FIGS. 12-13 are explanatory figures showing the method of use of the tool according to the present invention.
Figure 13:
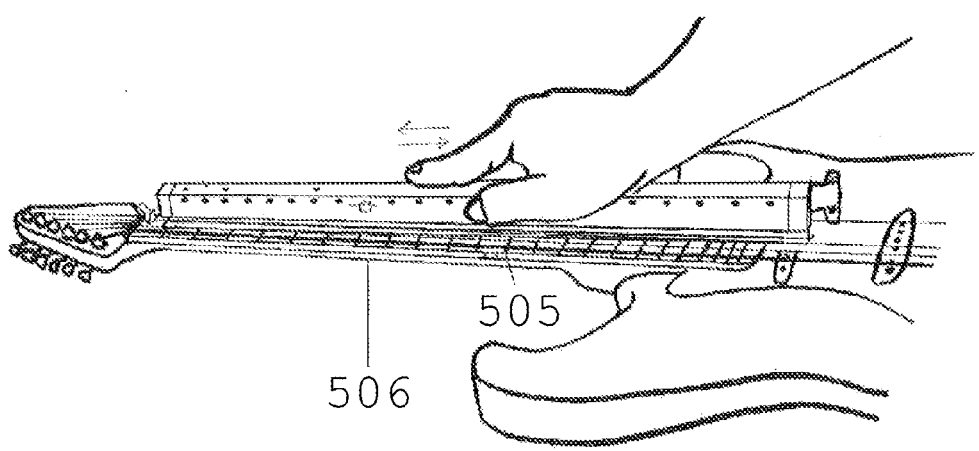

The system of the tool of FIG. 11 is a combination of the system described in the third embodiment (FIG. 7) and the fourth embodiment (FIG. 10).

The system of FIG. 7 (marked as No. 300 in FIG. 11B) is used to provide a symmetric curve entirely to the tool, and the system of FIG. 10 (marked as No. 400 in FIG. 11B) is used to provide an asymmetric curve.

Accessories (FIG. 18) are used for correctly adjusting the curve of the bottom to have a curve suitable for the fretboard. Adjustment to obtain the correct curve can be conducted by using three or more accessories.

The accessories are mounted onto the fretboard, aligned in a longitudinal direction, between the strings as shown in FIG. 18C. The accessories have four feet to allow them to self-stand, and thus they can be mounted correctly onto portions of the fretboard without wearing (marked as No. 902 in FIG. 17).

The accessories are identical in height, and the tool can be placed on the top of the accessories (marked as No. 901 in FIG. 17). When the bottom of the tool comes in contact with all the accessories arranged, it can be affirmed that the tool has obtained the correct curve.

As shown in FIG. 19, these accessories are arranged in a manner so that two accessories are arranged at the edge of the fretboard, and at least one accessory is arranged near the middle of the two accessories.

Figure 24:
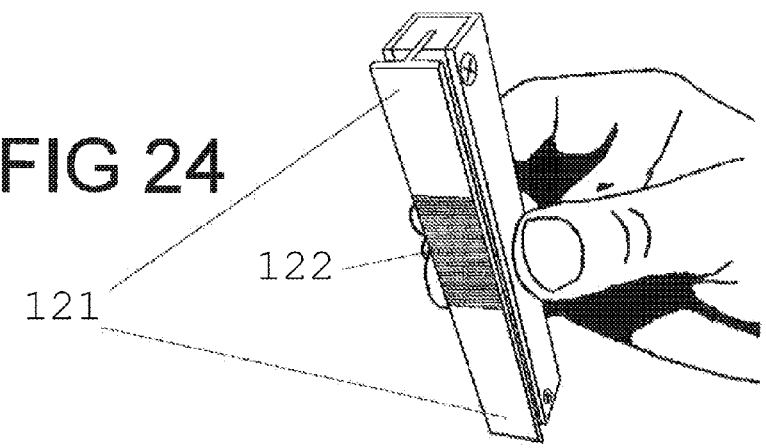

FIG. 24 is an example of the bottom of the tool. The bottom can have both of a material having a function for polishing (marked as No. 122 in FIG. 24) and a material having an anti-skid property (marked as No. 121 in FIG. 24), arranged in the longitudinal direction.

Figure 25:
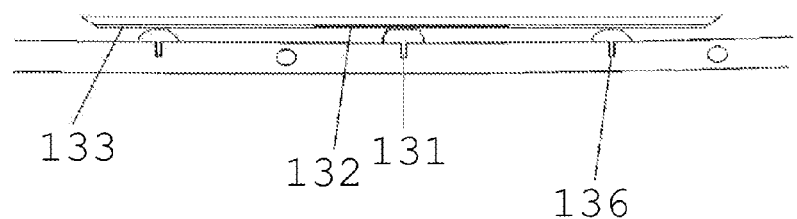
Figure 26:
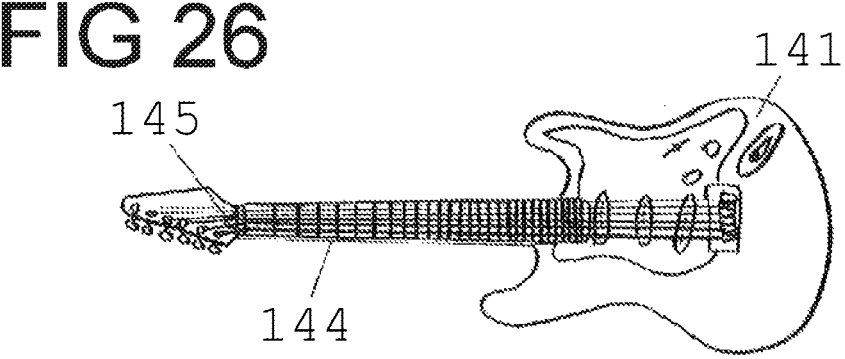
FIGS. 26-28 are figures showing three instruments used as examples to show how the present invention is used.
Figure 27:
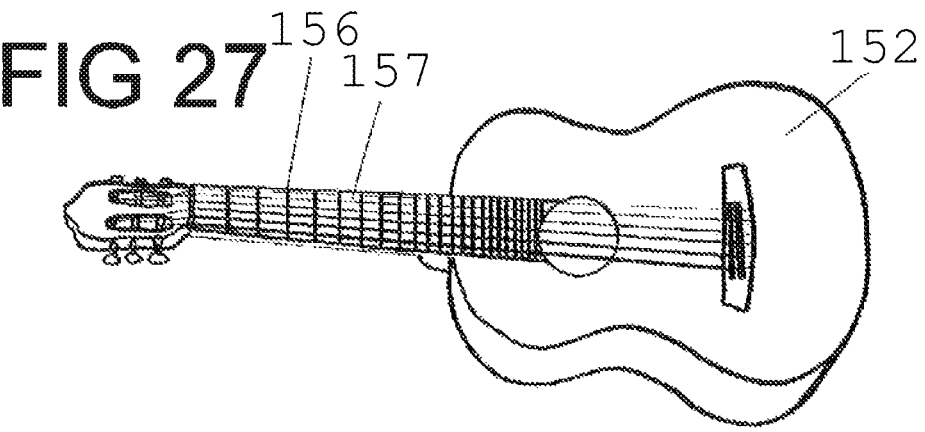
Figure 28:
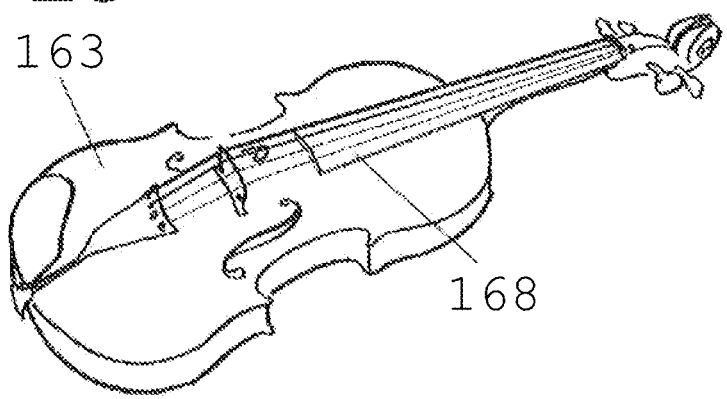
Figure 29:
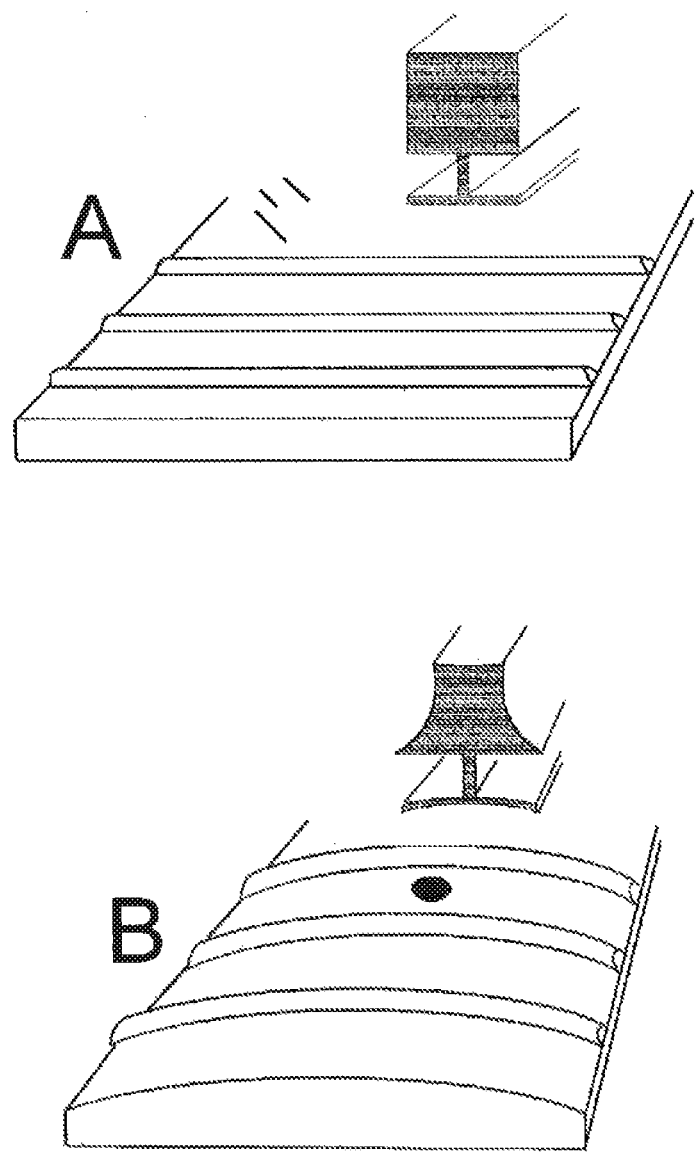
FIG. 29 is an explanatory figure showing the shape of the bottom of the tool according to the present invention.

Since both of the materials are arranged, polishing can be conducted for only the portions necessary to be polished (marked as No. 131 in FIG. 25), such as in a case where the polishing surface (marked as No. 132 in FIG. 25) comes into contact only with a particular fret (marked as No. 131 in FIG. 25), and not with other frets (marked as No. 133 and No. 136 in FIG. 25).

The invention claimed is:
1. A polishing tool used for providing frets, a fretboard or a fingerboard of a stringed instrument with a curve having altered degree of depression, comprising:
   a supporting strut,
   a handle attached to the supporting strut at an upper side of the supporting strut, and a bottom attached to the supporting strut at a lower side of the supporting strut; wherein the handle is provided with a mechanism to curve the supporting strut,
   an upper surface of the bottom is attached to the supporting strut, and a lower surface of the bottom is provided with a file or a polishing material,
   a thickness of the supporting strut is shorter than a distance between two neighboring strings of the stringed instrument, and
   a bar fixed to a side of the handle, wherein the handle is transformable by two mechanisms, a first mechanism being compression in a longitudinal direction caused by a force pulling the bar, and a second mechanism being a pressure caused by a force applied to the handle to form a curve in the bottom.

2. The tool of claim 1, wherein the bottom comprises two surfaces, and a polishing mechanism including diamond powder or a file is provided to one of the two surfaces.

3. The tool of claim 2, wherein another surface located at an opposite side of the bottom with respect to the one of the two surfaces, is attached to the supporting strut at a center of the bottom with respect to a width of the bottom, so that a cross section of the bottom and the supporting strut attached thereto together form the letter T turned upside down.

4. The tool of claim 3, wherein
the supporting strut is connected with the bottom at one side thereof and connected with the handle.

5. The tool of claim 4, wherein the handle is transformable into a desired shape and the bottom adhered firmly to the supporting strut is transformable into a desired shape.

6. The tool of claim 5, wherein the shape of the supporting strut is transformable in order to correct the curve of the bottom of the tool to obtain an identical shape as a surface of the frets, the fretboard or the fingerboard of the stringed instrument to be polished.

7. An auxiliary tool for creating a space by lifting the strings of a stringed instrument near a nut, while the tool of claim 1 is used.

8. The auxiliary tool for creating a space of claim 7, comprising: a solid main body having a width of approximately a distance between two neighboring strings near the nut of the stringed instrument,
a lever provided at an angle of 45 degrees at an upper portion of the main body,
two small inclined wings each provided at a side edge of the main body, each of the wings having a width of half the width of the bottom of the solid main body, wherein
the wings are configured to lift the two neighboring strings when the wings are placed under any two neighboring strings of the stringed instrument and the auxiliary tool is rotated in a horizontal direction, and
the lever is configured to, when the lever is lifted, further lift the two neighboring strings to obtain more height.

9. The tool of claim 1, wherein the supporting strut is configured to be transformable to have an asymmetric curve.

10. The tool of claim 1, wherein the bottom has an elongated shape with a length covering four or more frets, or a length covering the fretboard or the fingerboard, or a length covering from a nut to a last fret of the stringed instrument.

11. The tool of claim 1, wherein the bottom has such a thickness to be movable between the frets and the strings of the stringed instrument, between the fretboard and the strings of the stringed instrument, or between the fingerboard and the strings of the stringed instrument.

12. The tool of claim 1, wherein a width of the bottom has a dimension corresponding to a spacing for three strings or two times of a spacing for two strings, the spacing being measured at a center portion of a neck of the stringed instrument.

* * * * *